(12) United States Patent
Glover

(10) Patent No.: US 10,707,973 B2
(45) Date of Patent: Jul. 7, 2020

(54) METHOD OF TESTING BLUETOOTH LOW ENERGY DEVICES OVER-THE-AIR AND TESTING SYSTEM

(71) Applicant: Rohde & Schwarz GmbH & Co. KG, Munich (DE)

(72) Inventor: Brian Glover, Aldershot (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/117,972

(22) Filed: Aug. 30, 2018

(65) Prior Publication Data
US 2020/0076514 A1 Mar. 5, 2020

(51) Int. Cl.
| H04W 4/80 | (2018.01) |
| H04B 17/00 | (2015.01) |
| H04B 17/15 | (2015.01) |
| H04B 17/29 | (2015.01) |

(52) U.S. Cl.
CPC ......... H04B 17/0085 (2013.01); H04B 17/15 (2015.01); H04B 17/29 (2015.01)

(58) Field of Classification Search
CPC .................................. H04B 17/00; H04W 4/80
See application file for complete search history.

(56) References Cited

U.S. PATENT DOCUMENTS

| 4,365,347 A * | 12/1982 | Otsuka ...................... H03J 7/18 |
| | | 455/179.1 |
| 6,259,904 B1 * | 7/2001 | Branner .................. H03G 3/344 |
| | | 455/174.1 |
| 8,571,678 B2 * | 10/2013 | Wang .................. A61N 1/37276 |
| | | 607/31 |
| 10,575,199 B2 * | 2/2020 | Chakraborty ....... H04L 43/0823 |
| 2003/0096611 A1 * | 5/2003 | Cooper ................. H04W 48/16 |
| | | 455/434 |
| 2007/0234386 A1 * | 10/2007 | Kim ......................... H04N 5/50 |
| | | 725/38 |
| 2008/0031142 A1 * | 2/2008 | Wang ..................... H04L 43/50 |
| | | 370/242 |
| 2009/0116400 A1 * | 5/2009 | Sekiya ................ H04W 72/082 |
| | | 370/252 |
| 2009/0262709 A1 * | 10/2009 | Mason ...................... H04L 1/20 |
| | | 370/336 |
| 2010/0054512 A1 * | 3/2010 | Solum .................. H04R 25/554 |
| | | 381/315 |
| 2011/0085687 A1 * | 4/2011 | Edgar .................... H04R 25/30 |
| | | 381/315 |
| 2011/0209177 A1 * | 8/2011 | Sela et al. ............... H04L 43/50 |
| | | 370/242 |

(Continued)

*Primary Examiner* — Cindy Trandai
(74) *Attorney, Agent, or Firm* — Christensen O'Connor Johnson Kindness PLLC

(57) ABSTRACT

A method of testing a Bluetooth low energy device over-the-air is described, wherein a Bluetooth low energy connection is established. An enable test mode command is transmitted to the device under test. The testing is started with transmitting at least one of a test transmission command and a test receiving command. Test radio frequency test physical layer packets are transmitted in a channel to be tested. A channel switching sequence takes place. At least one of a stop transmission command and a stop receiving command is transmitted once the intended testing on the channel to be tested has been completed. Further, a testing system is described.

20 Claims, 5 Drawing Sheets

(56) References Cited

U.S. PATENT DOCUMENTS

| | | | |
|---|---|---|---|
| 2011/0216809 A1* | 9/2011 | Gan | H04B 1/715 375/140 |
| 2012/0213295 A1* | 8/2012 | Quere | H04N 21/4331 375/240.25 |
| 2013/0109909 A1* | 5/2013 | van Gerwen | H04R 25/43 600/25 |
| 2013/0238935 A1* | 9/2013 | Radulescu | G06F 11/221 714/32 |
| 2014/0044265 A1* | 2/2014 | Kocher | H04L 9/083 380/277 |
| 2014/0270211 A1* | 9/2014 | Solum | H04R 25/554 381/60 |
| 2016/0007247 A1* | 1/2016 | Lee | H04W 36/0066 370/331 |
| 2016/0021672 A1* | 1/2016 | Delsol | H04W 24/06 455/450 |
| 2017/0034647 A1* | 2/2017 | Takeuchi | H04W 8/005 |
| 2017/0078032 A1* | 3/2017 | Olgaard | H04B 17/17 |
| 2018/0227684 A1* | 8/2018 | Ungstrup | H04M 1/7253 |

* cited by examiner

METHOD OF TESTING BLUETOOTH LOW ENERGY DEVICES OVER-THE-AIR AND TESTING SYSTEM

FIELD OF THE DISCLOSURE

Embodiments of the present disclosure generally relate to a method of testing Bluetooth low energy devices over-the-air. Further, embodiments of the present disclosure generally relate to a testing system for testing a Bluetooth low energy device over-the-air.

BACKGROUND

Bluetooth low energy (BLE) devices are known in the state of the art as they are used for transmitting data in a nearfield to another Bluetooth device while the power consumption is reduced. The Bluetooth low energy is also known as Bluetooth Smart due to its smart communication techniques allowing less power consumption.

So far, Bluetooth low energy devices are tested with regard to their radio frequency performance while using a physical connection to control the respective Bluetooth low energy device in order to perform the testing according to the standardized Bluetooth low energy radio frequency test specifications used in the community.

However, establishing the physical connection to control the Bluetooth low energy device is time consuming since cables have to be connected to the respective device. Further, the control cables used may restrict the testing quality as well as the testing area in case of short cables. In addition, the physical connection may be prone to failure so that the respective testing of the Bluetooth low energy device may be erroneous.

Accordingly, there is a need for a possibility to perform radio frequency testing of a Bluetooth low energy device in an easy and cost-efficient manner.

SUMMARY

Embodiments of the present disclosure generally provide a method of testing a Bluetooth low energy device over-the-air, with the following steps:

establishing a Bluetooth low energy connection between a device under test and a tester;

transmitting via the tester an enable test mode command to the device under test to enable a test mode on the device under test;

transmitting via the device under test an acknowledgement signal indicating that the test mode is enabled on the device under test;

starting the testing with transmitting via the tester at least one of a test transmission command and a test receiving command to start a transmission testing and a receiving testing, respectively;

transmitting via the device under test an acknowledgement signal indicating that at least one of the transmission testing and the receiving testing is started successfully;

transmitting via at least one of the tester and the device under test radio frequency test physical layer packets in a channel to be tested during a connection interval of the Bluetooth low energy connection;

changing, when the duration of the connection interval is over, the channel to a next hopping channel;

transmitting a continue command from the tester to the device under test when the testing in the channel to be tested is incomplete;

receiving from the device under test as a response to the continue command at least one of a null in the transmission testing and a receiving report in the receiving testing;

changing the channel to the channel to be tested; and transmitting via the tester at least one of a stop transmission command and a stop receiving command once the intended testing on the channel to be tested has been completed.

Further, embodiments of the present disclosure generally provide a testing system for testing a Bluetooth energy device over-the-air, the testing system comprising a tester having at least one antenna. The testing system is configured to perform the method of testing Bluetooth low energy devices over-the-air as described above.

Accordingly, a possibility is provided to perform transmission and/or receiving measurements (transmission testing and/or receiving testing) of the device under test according to the Bluetooth low energy radio frequency test specification on a Bluetooth low energy live link that has been established previously. Hence, the respective measurements can be done without any control line, namely over-the-air (OTA). The Bluetooth low energy live link corresponds to the Bluetooth low energy connection that was established between the device under test and the tester at the beginning of the testing process. Therefore, a regular Bluetooth low energy connection has been established that is used for testing the Bluetooth low energy device over-the-air. In other words, the respective testing of the Bluetooth low energy device can be performed without a physical control connection to the tester since the respective information is sent via the Bluetooth low energy live link or rather the regular Bluetooth low energy connection established previously. Furthermore, the respective testing of the Bluetooth low energy device under test can be performed with or without a physical radio frequency connection.

The transmission testing and/or the receiving testing is initiated by a respective test command, namely the test transmission command and/or the test receiving command depending on the test scenario intended. Accordingly, a transmission testing mode and/or a receiving testing mode may be enabled.

In general, the device under test may be tested with regard to its transmission/receiving properties.

Therefore, a testing with regard to the transmission properties or rather the transmission characteristics of the device under test may be performed that is initiated by transmitting via the tester a test transmission command to start the transmission testing.

Alternatively or subsequently, a testing with regard to the receiving properties or rather the receiving characteristics of the device under test may be performed that is initiated by transmitting via the tester a test receiving command to start the receiving testing.

In both scenarios, the device under test transmits an acknowledgement signal indicating that the transmission testing and/or the receiving testing is started on the device under test successfully.

Depending on the testing scenario, the tester or the device under test transmits the radio frequency test physical layer packets in the channel to be tested during the connection interval. Furthermore, the radio frequency test physical layer packets may be transmitted by the tester and the device under test subsequently or rather alternatively.

Moreover, depending on the current testing scenario applied, the device under test transmits in response to the continue command transmitted by the tester the null in the transmission testing, namely in the transmission testing mode, and/or the receiving report in the receiving testing, namely in the receiving testing mode.

Put it another way, the device under test is stimulated, in the transmission testing (mode), to send the radio frequency test physical layer packets in a maintained Bluetooth low energy connection established previously In some embodiments, several steps can be summarized to a channel changing sequence since a new hopping channel is used after the duration of the connection interval is over (typical channel hopping) wherein the channel is changed back to the channel to be tested for transmitting the radio frequency test physical layer packets. They include but are not limited to the following:

changing, when the duration of the connection interval is over, the channel to a next hopping channel;

transmitting a continue command from the tester to the device under test when the testing in the channel to be tested is incomplete;

receiving from the device under test as a response to the continue command at least one of a null in the transmission testing and a receiving report in the receiving testing; and changing the channel to the channel to be tested.

Therefore, the above mentioned steps correspond to one embodiment of a channel changing sequence.

In general, channel hopping is a feature of the Bluetooth low energy (BLE) as well as the Bluetooth specification. The channel hopping requires to switch to another channel once the duration of the connection interval is over.

Since the duration of the connection interval might be too short for running all the required tests in one specific channel, the tester transmits the respective continue command. The continue command effects that the Bluetooth low energy connection is maintained in the specific channel, namely the channel to be tested. In some embodiments, the continue command ensures that the channel is switched back or rather changed to the specific channel, namely the channel to be tested.

Thus, the channel changing sequence comprises the channel hopping according to the specification and additionally changing the channel to which the channel hopping has hopped to the channel to be tested. In other words, the channel changing sequence annuls or rather circumvents the effect of the channel hopping.

According to an aspect, the channel changing sequence is performed as often until all testing has been performed on the channel to be tested. Thus, it is ensured that the channel to be tested is tested or rather measured completely so as to obtain all information required with regard to the radio frequency performance of the Bluetooth low energy device under test with regard to the particular channel to be tested. Once the testing is complete, the tester transmits the respective stop command.

According to another aspect, the connection interval is set when the Bluetooth low energy connection is established. Hence, the respective duration of the connection interval is set during the establishment of the Bluetooth low energy live link used for testing the Bluetooth low energy device.

In some embodiments, the duration of the connection interval is adjustable. For instance, the duration may last up to 4 seconds.

In addition, the enable test mode command may comprise a key to secure the testing. The key corresponds to a password or any other security member used for starting the testing in a secure manner. The vendor of the device under test may decide how securely the respective key shall be implemented. For instance, an identical key can be used for all devices of the same vendor or rather for all devices of the same type. Alternatively, the respective key may be calculated using the serial number of the respective device under test so as to increase the security.

In the transmission testing, the device under test may transmit the radio frequency test physical layer packets that are received by the tester. Hence, the transmission properties of the Bluetooth low energy device, namely the device under test, are tested appropriately while transmitting the physical layer packets which are received by the tester for analyzing purposes.

Alternatively or additionally, the tester transmits, in the receiving testing, the radio frequency test physical layer packets that are received by the device under test. Therefore, the receiving properties or rather the receiving characteristics of the Bluetooth low energy device, namely the device under test, can be tested appropriately. The device under test gathers the respective information internally wherein this information may be forwarded to the tester via the receiving report(s) so that the tester obtains all information required for evaluating or rather analyzing the device under test.

Another aspect provides that the channel to be tested is selected when starting the test by transmitting the respective test command. Therefore, the tester decides which channel shall be tested so that the respective test command is transmitted via the channel selected by the tester.

Moreover, the physical layer packets may be transmitted in the channel to be tested repetitively in regular intervals during the connection interval. Therefore, a certain time delay is ensured that is used by the device under test or rather the tester allowing the respective component to prepare for the transmission of the respective physical layer packets. Thus, the delay time corresponds to a preparation time.

In addition, a link layer channel map request may be used so as to avoid changing to a channel already tested. This ensures that the testing of the device under test can be done efficiently since a channel that has already been tested will not be used by the tester for starting a new testing.

Furthermore, the receiving report may comprise information about at least one of the number of packets received, the number of bit errors and the number of cyclic redundancy check errors. Thus, the tester receives all required information for analyzing the radio frequency receiving properties or rather characteristics of the device under test. The respective information is submitted by the device under test directly to the tester via the Bluetooth low energy connection established, namely the Bluetooth low energy live link.

Generally, the testing system is configured to perform the method of testing Bluetooth low energy devices over-the-air as described above wherein the advantages mentioned above also apply for the testing system in a similar manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
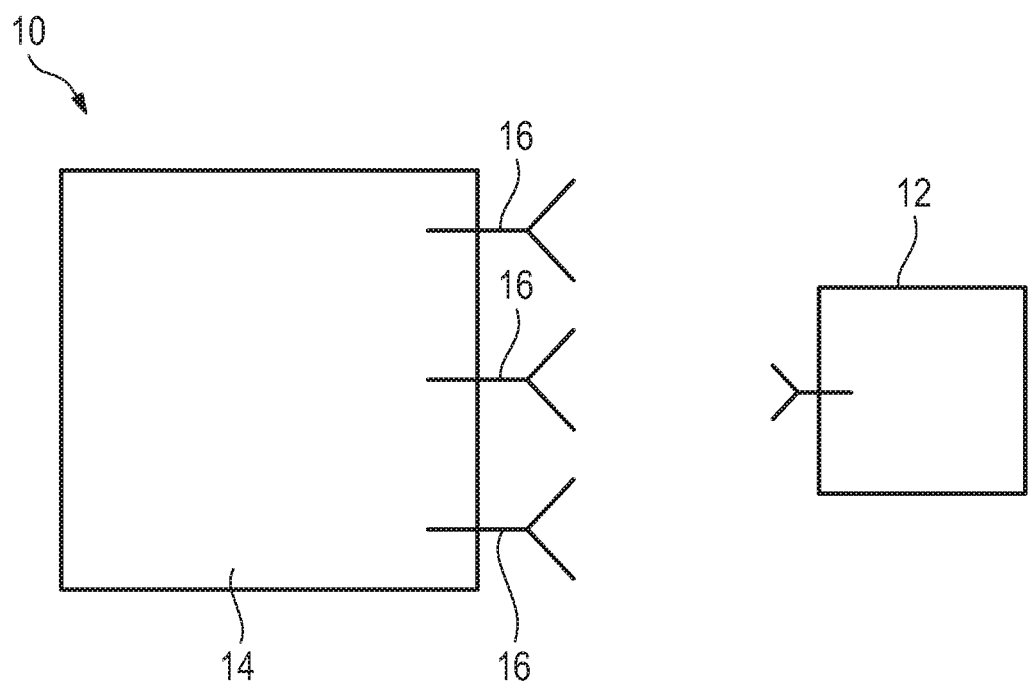
FIG. 1 schematically shows a representative example of a testing system according to the present disclosure.

In FIG. 1, a testing system 10 is shown that is used for testing a Bluetooth low energy device under test 12 over-the-air. As shown in FIG. 1, the testing system 10 comprises a tester 14 that has at least one antenna 16 for interacting with a Bluetooth low energy device under test 12 over-the-air. In some embodiments, a Bluetooth low energy connection (BLE connection) or rather a Bluetooth low energy live link is established between the device under test 12 and the at least one antenna 16.

In general, the testing system 10 ensures that no physical connection is required for controlling the device under test 12 as will be described hereinafter while taking FIGS. 2 to 5 into account. Therefore, the testing system 10 is configured to perform a method of testing the device under test 12 over-the-air. In some embodiments, the controlling of the device under test 12 is done over-the-air (OTA).

Figure 2:
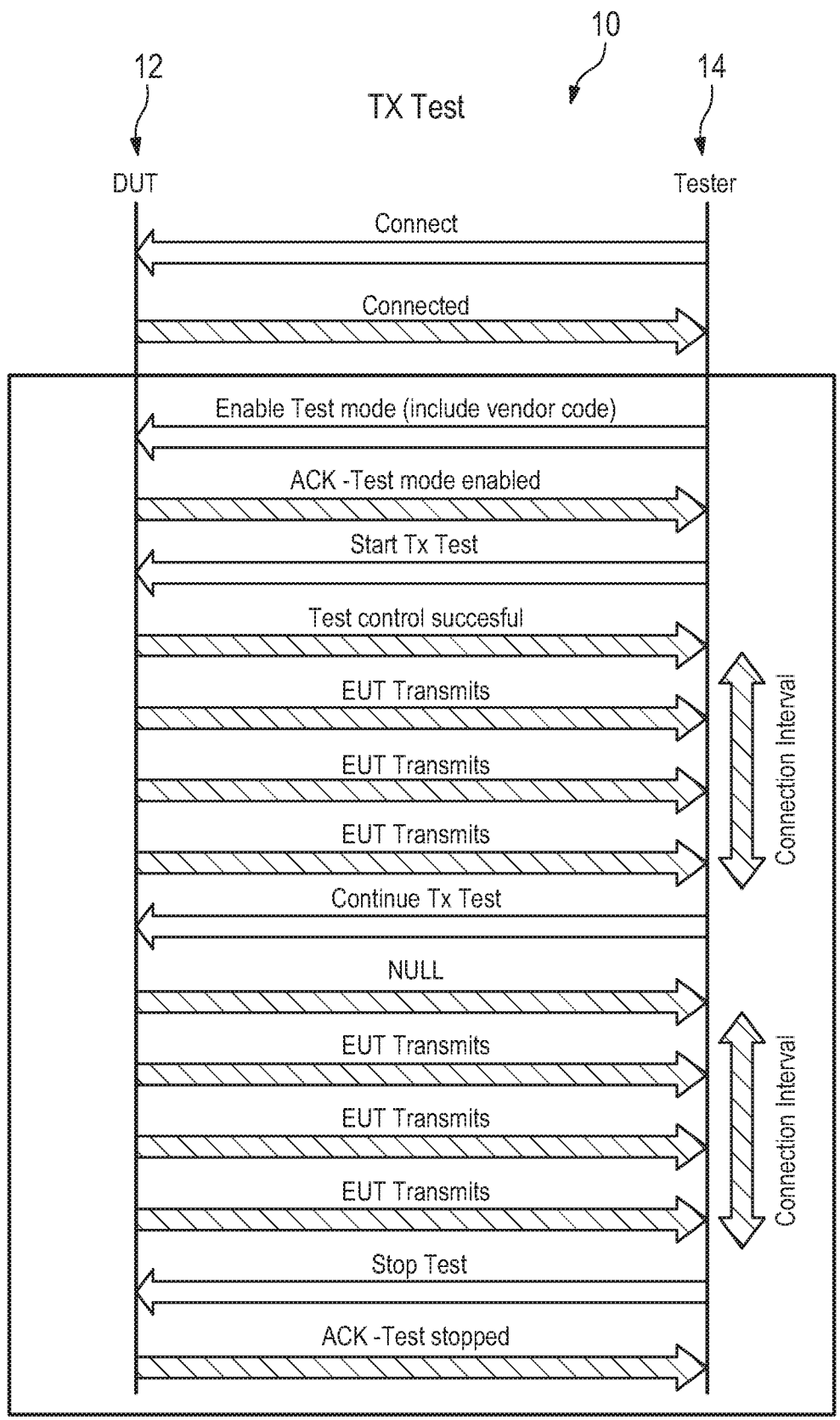
FIG. 2 schematically shows an overview illustrating a method of testing a Bluetooth low energy device over-the-air according to a first embodiment.

In FIG. 2, a method of testing the Bluetooth low energy device under test 12 over-the-air is shown in more detail wherein the transmission properties or rather the transmission characteristics of the device under test 12 are tested.

In a first step, a Bluetooth low energy connection is established between the device under test 12 and the tester 14 of the testing system 10. For doing so, the tester 14 may transmit a connection request that is accepted by the device under test 12.

During establishment of the Bluetooth low energy connection, the connection interval is set that is used by the Bluetooth low energy connection. In some embodiments, the duration of the connection interval is adjustable so that the duration may be set in a range, for example, up to 4 seconds.

Then, the tester 14 transmits an enabled test mode command which may include a vendor code or rather a key to the device under test 12 so as to enable a test mode on the device under test 12 (provided that the vendor code or rather the key is correct). The tester 14 transmits the test mode command in a certain channel of the Bluetooth low energy connection that corresponds to the channel to be tested. In other words, the channel to be tested is selected by the tester 14 while sending the test mode command in a particular channel. The device under test 12 transmits an acknowledgement signal which indicates that the test mode is enabled on the device under test 12 so that the respective testing can be initiated provided that the vendor code or rather the key submitted was correct.

In the shown embodiment illustrating the transmitting testing, the tester 14 starts the testing by transmitting a test transmission command to start the transmission testing of the device under test 12. The device under test 12 responds to the test transmission command received by transmitting an acknowledgement signal indicating that the transmission testing is started successfully on the device under test 12. Put it another way, the transmission testing mode is enabled.

Figure 4:
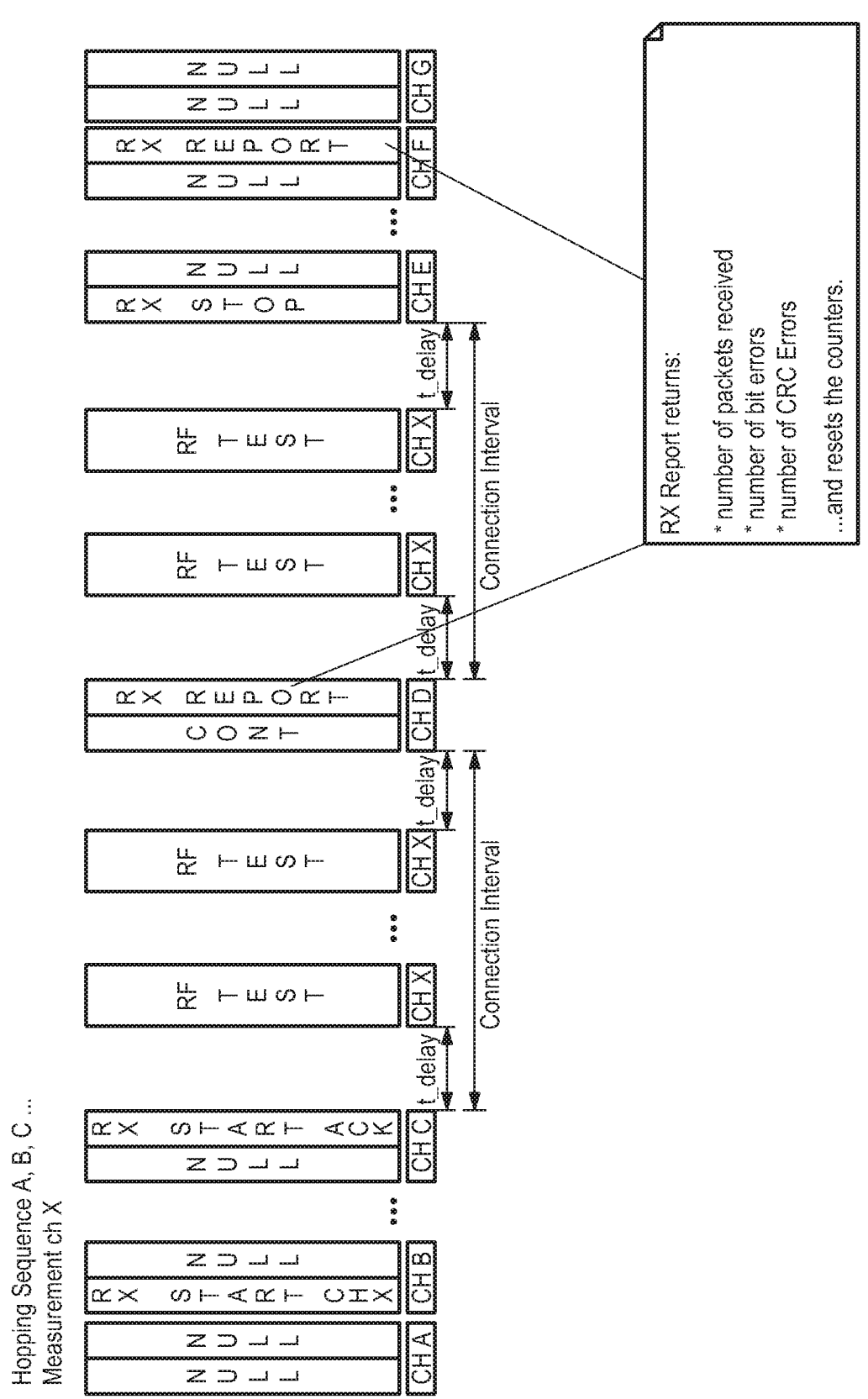
FIG. 4 schematically shows an overview illustrating a representative embodiment of the channel changing process.

Then, the device under test 12 transmits radio frequency test physical layer packets in the channel to be tested which has been defined previously by the tester 14 as described above. The respective radio frequency test physical layer packets are transmitted repetitively in regular intervals during the connection interval which has been set when the Bluetooth low energy connection was established. This becomes already obvious in FIG. 4 even though FIG. 4 illustrates the channel changing sequence for a receiving testing of the device under test 12.

When the duration of the connection interval is over, the respective channel is changed by the tester 14 to a next hopping channel of the several hopping channels that can be used by the Bluetooth low energy connection. In the next hopping channel, the tester 14 transmits a continue command to the device under test 12 in case that the testing in the channel to be tested was not completed in the connection interval which duration is over. In other words, when the testing in the channel to be tested is incomplete, the tester 14 transmits the continue command.

Then, the device under test 12, in the shown embodiment of the transmission testing, receives the continue command and transmits a null as a response to the continue command received. The null is received by the tester 14. The tester 14 processes the null received so that the channel is changed again to the channel to be tested. This procedure, starting with the step when the duration of the connection interval is over until the channel is changed back to the channel to be tested, is called channel hopping.

Then, the device under test 12 transmits the physical layer packets in the channel to be tested again in a repetitive manner in regular intervals during the next connection interval of the Bluetooth low energy connection established as described above.

Then, the duration of the next connection interval may be over initiating the channel changing as described above. In some embodiments, the channel hopping is initiated as being part of the Bluetooth low energy (BLE) specification wherein the continue command changes the channel back to the channel to be tested. The channel hopping (part of the BLE specification) and the additional changing together correspond to the channel changing sequence.

The channel changing sequence is performed as often until all testing has been performed on the channel to be tested. Hence, the channel changing sequence is performed until the testing is complete.

Once the intended testing on the channel to be tested has been completed, the tester 14 transmits a stop transmission command to the device under test 12 that transmits an acknowledgement signal indicating that the respective testing has been stopped.

Then, a new channel to be tested may be selected by the tester 14.

For this purpose, a link layer channel map request may be used. This inter alia avoids that the new channel is a channel already tested. In general, the link layer channel map request avoids changing to a channel already tested.

Figure 3:
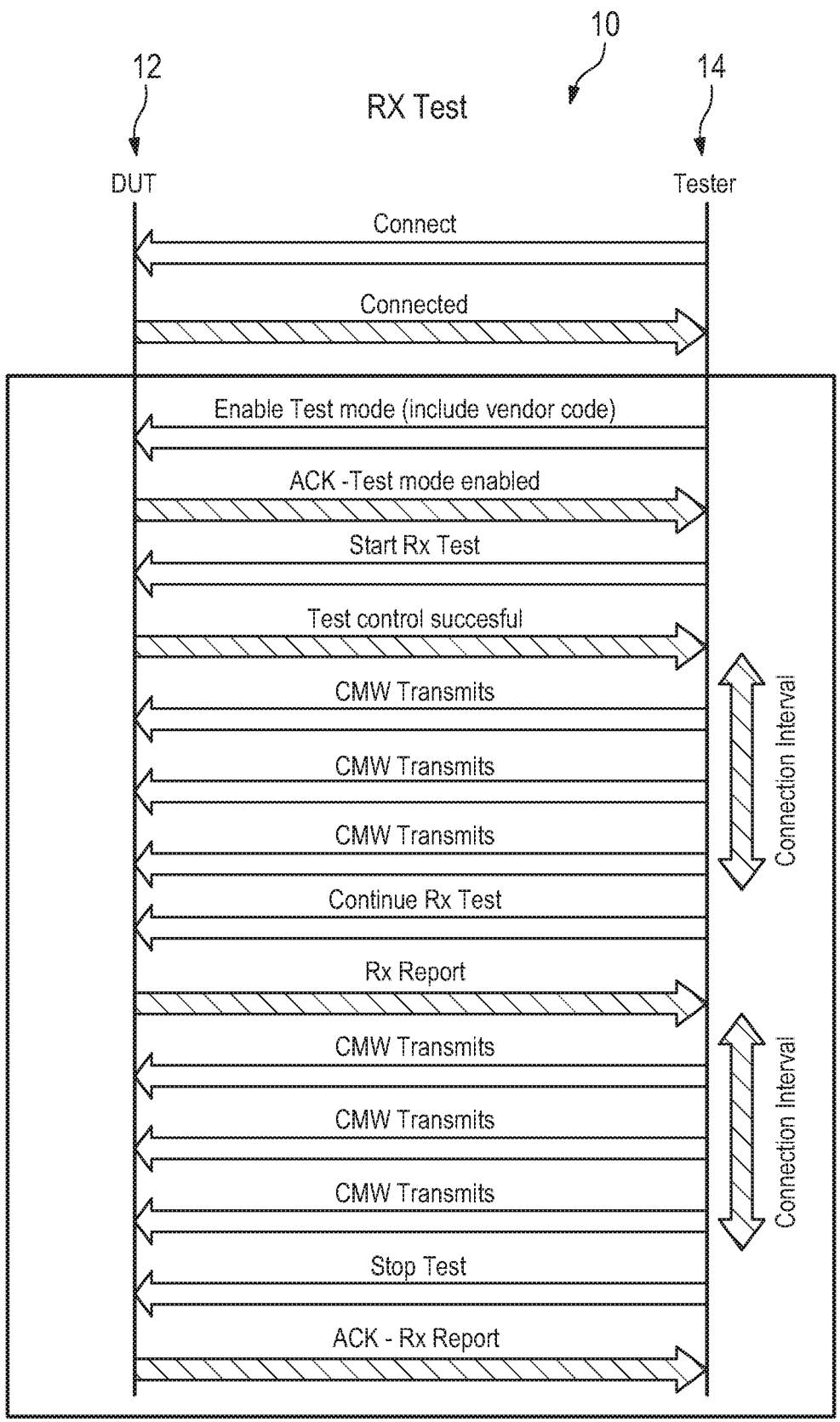
FIG. 3 schematically shows an overview illustrating a method of testing a Bluetooth low energy device over-the-air according to a second embodiment.

In FIG. 3, the method of testing the Bluetooth low energy device under test 12 over-the-air is shown for a second embodiment in which the receiving characteristics or rather the receiving properties of the device under test 12 are tested.

In some embodiments, the second embodiment distinguishes from the first embodiment in that the testing is started by transmitting a test receiving command via the tester 14 so as to start the receiving testing instead of a test transmission command to start the transmission testing as described with respect to FIG. 2.

Accordingly, the Bluetooth low energy connection is established in the manner described above. Once the respective test receiving command has been received by the device under test 12, the device under test 12 transmits an acknowledgement signal indicating that the receiving testing is started successfully. Then, the tester 14 transmits radio frequency test physical layer packets in the channel to be tested that has been selected previously as described above. The radio frequency test physical layer packets are transmitted in regular intervals during the connection interval as shown in FIG. 3.

When the duration of the connection interval is over, the channel is changed to a next hopping channel wherein the tester 14 transmits a continue command to the device under test 12 in case that all testing in the channel to be tested was not completed in the connection interval which duration is over. In other words, the continue command is transmitted in case that the testing is incomplete for the respective channel to be tested.

The device under test 12 receives the continue command wherein the device under test 12 responses to the continue command by transmitting a receiving report. Hence, the receiving report corresponds to a response of the device under test 12 to the continue command.

The receiving report transmitted by the device under test 12 is received by the tester 14. In general, the receiving report comprises information about at least one of the number of packets received, the number of bit errors and the number of cyclic redundancy check errors. Therefore, the tester 14 gathers the respective information required from the device under test 12 over-the-air for evaluating the device under test 12 with regard to its receiving properties or rather its receiving characteristics.

In addition, the tester 14 changes the channel back to the channel to be tested so that the tester 14 may further transmit the radio frequency test physical layer packets via the channel to be tested in a known manner. This means that the respective radio frequency test physical layer packets are transmitted in regular intervals during the next connection interval until all testing is done or rather all radio frequency test physical layer packets have been transmitted.

Once the antenna testing on the channel to be tested has been completed, the tester 14 transmits a stop receiving command to the device under test 12. The device under test 12 receives the stop receiving command and responds to the tester 14 via transmitting an acknowledgement signal which indicates that the receiving testing is stopped. Further, the device under test 12 submits a final receiving report to the tester 14 so that the tester 14 has gathered all information.

After the channel to be tested has been tested completely, namely after the respective stop transmission, and/or the stop receiving command has been issued, another channel is selected for testing purposes by the tester 14. While doing so, a link layer channel map request may be used so as to avoid changing to a channel that has been tested already. The link layer channel map request may also be used during the respective channel hopping sequences mentioned above.

In FIG. 4, the channel changing sequence for the receiving testing of the device under test 12 is shown in a more illustrative manner.

In FIG. 4, different channels (CH A, CH B, CH C, CH D, CH E, CH F, CH G, CH X) are shown as well as signals transmitted by the tester 14 (on the left side of the respective channel) and signals transmitted by the device under test 12 (on the right side of the respective channel). The channel to be tested is labeled by CH X in FIG. 4.

The tester 14 transmits the test receiving command while selecting the channel to be tested CH X simultaneously. In the shown embodiment, the tester 14 provides the respective information with the test receiving command. Alternatively, the tester 14 may transmit the test receiving command directly on the channel to be tested CH X.

Once the communication between the tester 14 and the device under test 12 is synchronized on the channel to be tested CH X, the radio frequency test begins while transmitting the radio frequency test physical layer packets repetitively in regular intervals during the connection interval indicated in FIG. 4.

Then, the tester 14 transmits the continue command CONT in a channel CH D that is different to the channel to be tested CH X. The device under test 12 transmits its receiving report RX REPORT via this channel CH D. Afterwards, the tester 14 and the device under test 12 have changed back to the channel to be tested CH X wherein the radio frequency test physical layer packets are transmitted in the channel to be tested CH X.

Thus, the channel has been changed from the channel to be tested to a next hopping channel for transmitting the continue command CONT and receiving the receiving report RX REPORT. Then, the tester 14 has changed the channel again so as to get back to the channel to be tested, namely channel X. Again, the radio frequency test physical layer packets are transmitted in the channel to be tested CH X repetitively in regular intervals during the connection interval.

In the shown embodiment, the testing is stopped by transmitting a respective stop command RX STOP via a next hopping channel, namely channel CH E. The device under test 12 acknowledges the respective stop command RX STOP by a null.

The null is received by the tester 14 which changes the channel to a next hopping channel CH F while transmitting a null which is received by the device under test 12 which in turn transmits the receiving report RX REPORT via this channel, namely channel CH F. Alternatively, the device under test 12 may directly transmit the receiving report RX REPORT once the respective stop command RX STOP has been received. In the shown embodiment, this alternative would mean that the device under test 12 transmits its receiving report RX REPORT in channel CH E.

Figure 5:
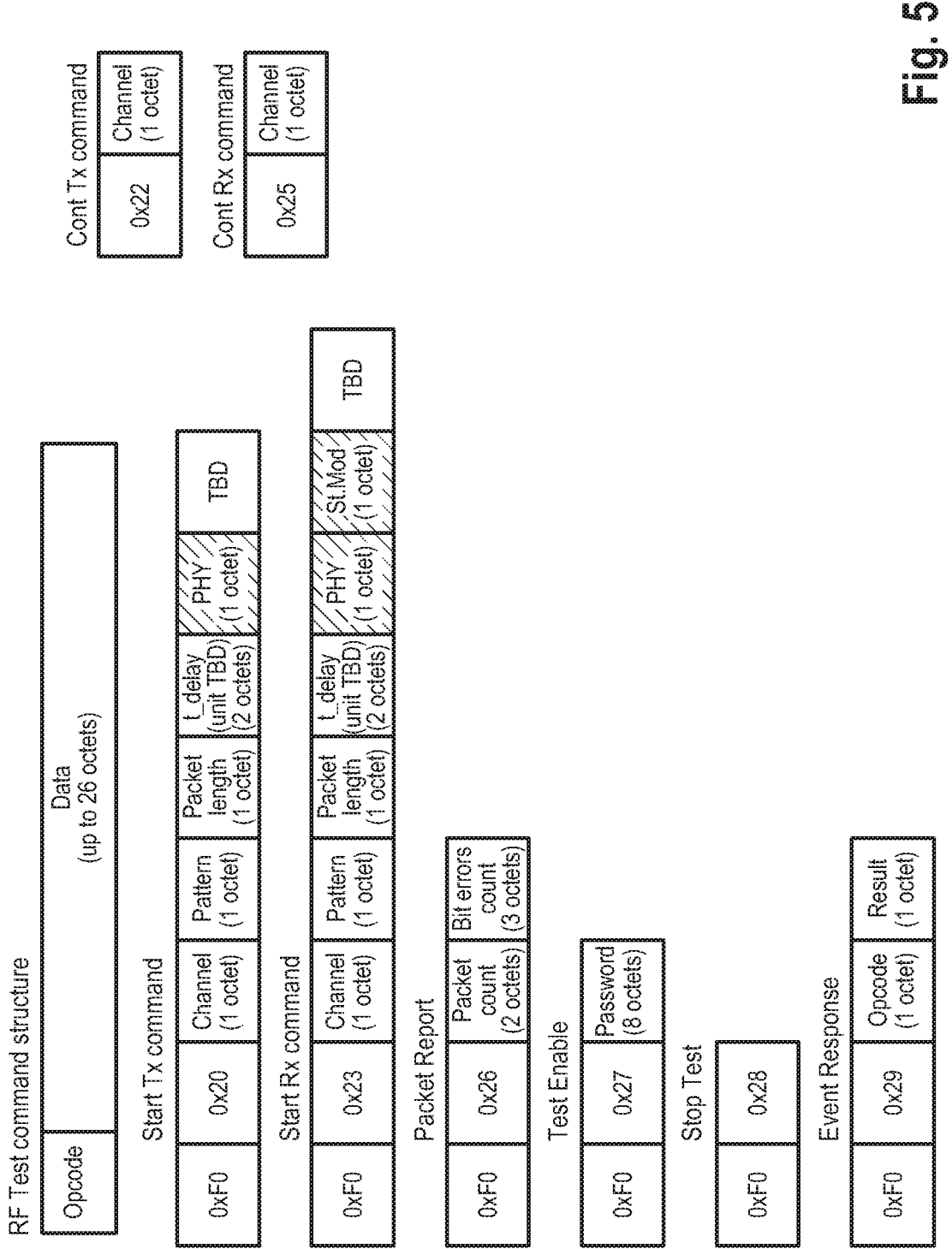
FIG. 5 schematically shows an overview illustrating a representative example of the structure of the signals exchanged.

In FIG. 5, an overview is shown that illustrates a representative example of the structure, for example the respective frames, of the respective signals exchanged between the Bluetooth low energy (BLE) device under test 12 and the tester 14. In general, the Bluetooth low energy (BLE) device under test 12 can be tested over-the-air (OTA) wherein no physical control line is required for controlling the Bluetooth low energy (BLE) device under test 12. Therefore, testing the device under test 12 is simplified.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by The embodiments of the invention in which an exclusive property or privilege is claimed are defined as follows:

1. A method of testing a Bluetooth low energy device over-the-air, comprising:
    establishing a Bluetooth low energy connection between a device under test and a tester;
    transmitting, via the tester, an enable test mode command to the device under test to enable a test mode on the device under test;
    transmitting, via the device under test, an acknowledgement signal indicating that the test mode is enabled on the device under test;
    starting the testing with transmitting, via the tester, at least one of a test transmission command or a test receiving command to start a transmission testing or a receiving testing, respectively, wherein said transmission testing and/or said receiving testing relates to performing transmission and/or receiving measurements of the device under test;
    transmitting, via the device under test, an acknowledgement signal in response to the test transmission command received or the test receiving command received, the acknowledgement signal indicating that at least one of the transmission testing or the receiving testing is started successfully;
    transmitting, via at least one of the tester or the device under test, radio frequency test physical layer packets in a channel to be tested during a connection interval of the Bluetooth low energy connection;
    changing, when the duration of the connection interval is over, the channel to a next hopping channel;
    transmitting a continue command from the tester to the device under test when the testing in the channel to be tested is incomplete;
    receiving from the device under test as a response to the continue command at least one of a null in the transmission testing or a receiving report in the receiving testing;
    changing the channel to the channel to be tested since the continue command effecting that the Bluetooth low energy connection is maintained in the channel to be tested; and
    transmitting, via the tester, at least one of a stop transmission command or a stop receiving command once the intended testing on the channel to be tested has been completed.

2. The method of claim 1, wherein the channel changing sequence is performed as often until all testing has been performed on the channel to be tested.

3. The method of claim 1, wherein the connection interval is set when the Bluetooth low energy connection is established.

4. The method of claim 1, wherein the duration of the connection interval is adjustable.

5. The method of claim 1, wherein the enable test mode command comprises a key to secure the testing.

6. The method of claim 1, wherein, in the transmission testing, the device under test transmits the radio frequency test physical layer packets that are received by the tester.

7. The method of claim 1, wherein, in the receiving testing, the tester transmits radio frequency test physical layer packets that are received by the device under test.

8. The method of claim 1, wherein the channel to be tested is selected when starting the test by transmitting the respective test command.

9. The method of claim 1, wherein the physical layer packets are transmitted in the channel to be tested repetitively in regular intervals during the connection interval.

10. The method of claim 1, wherein a link layer channel map request is used so as to avoid changing to a channel already tested.

11. The method of claim 1, wherein the receiving report comprises information about at least one of the number of packets received, the number of bit errors and the number of cyclic redundancy check errors.

12. A testing system for testing a Bluetooth low energy device over-the-air, comprising a tester with at least one antenna, the testing system being configured to:
    establish a Bluetooth low energy connection between a device under test and a tester;
    transmit, via the tester, an enable test mode command to the device under test to enable a test mode on the device under test;
    transmit, via the device under test, an acknowledgement signal indicating that the test mode is enabled on the device under test;
    start the testing with transmitting, via the tester, at least one of a test transmission command or a test receiving command to start a transmission testing or a receiving testing, respectively, wherein said transmission testing and/or said receiving testing relates to performing transmission and/or receiving measurements of the device under test;
    transmit, via the device under test, an acknowledgement signal in response to the test transmission command received or the test receiving command received, the acknowledgement signal indicating that at least one of the transmission testing or the receiving testing is started successfully;
    transmit, via at least one of the tester or the device under test, radio frequency test physical layer packets in a channel to be tested during a connection interval of the Bluetooth low energy connection;
    change, when the duration of the connection interval is over, the channel to a next hopping channel;
    transmit a continue command from the tester to the device under test when the testing in the channel to be tested is incomplete;
    receive from the device under test as a response to the continue command at least one of a null in the transmission testing or a receiving report in the receiving testing;
    change the channel to the channel to be tested since the continue command effecting that the Bluetooth low energy connection is maintained in the channel to be tested; and
    transmit via the tester at least one of a stop transmission command or a stop receiving command once the intended testing on the channel to be tested has been completed.

13. The testing system of claim 12, wherein the testing system is configured perform the channel changing sequence as often until all testing has been performed on the channel to be tested.

14. The testing system of claim 12, wherein the testing system is configured to set the connection interval when the Bluetooth low energy connection is established.

15. The testing system of claim 12, wherein the testing system is configured to adjust the duration of the connection interval.

16. The testing system of claim 12, wherein the enable test mode command comprises a key to secure the testing.

17. The testing system of claim 12, wherein, in the transmission testing, the device under test transmits the radio frequency test physical layer packets that are received by the tester.

18. The testing system of claim 12, wherein, in the receiving testing, the tester transmits radio frequency test physical layer packets that are received by the device under test.

19. The testing system of claim 12, wherein the testing system is configured to select the channel to be tested when starting the test by transmitting the respective test command.

20. The testing system of claim 12, wherein the physical layer packets are transmitted in the channel to be tested repetitively in regular intervals during the connection interval.

* * * * *